3,409,463
Patented Nov. 5, 1968

3,409,463
TREATMENT OF CELLULOSIC MATERIALS WITH A POLYAZIRIDINYLPHOSPHORAMIDE AND A SULFAMIDE
Robert B. Le Blanc, Midland, Mich., and Richard H. Symm, Lake Jackson, Tex., assignors to The Dow Chemical Company, Midland, Mich., a corporation of Delaware
No Drawing. Filed Sept. 17, 1964, Ser. No. 397,274
18 Claims. (Cl. 117—143)

---

ABSTRACT OF THE DISCLOSURE

A composition for rendering cellulosic materials permanently fire-resistant comprising:
(1) A polyaziridinylphosphoramide and
(2) A sulfamide derived from ammonia or a primary alkylamine.

---

This invention relates to improved cellulosic compositions, to novel treating compositions and to the use of such treating compositions for the preparation of said improved cellulosic materials. More particularly, the present invention relates to the use of both a sulfamide compound (or a polymer based upon a sulfamide compound) and an aziridinyl phosphine oxide or sulfide for the treatment of cellulose-containing and cellulose-derived materials such as wood, paper, cardboard, jute, rayon and cotton to impart flame-resistance, dimensional stability, wash-resistance and improved strength properties to such materials.

The use of various aziridinyl phosphine oxide compounds for the treatment of textiles is well known and is disclosed, for example, by U.S. Patent 3,034,919 to Steinhauer. The use of sulfamide with tetrakis (hydroxymethyl)phosphonium salts or tris(hydroxymethyl)phosphine oxide to form a textile flame-proofing resin is disclosed in British Patent 761,985.

It has now been found that the combination of a sulfamide compound (or a polymer based thereon) and an aziridinyl phosphine oxide (or sulfide) in amounts sufficient to impart flame-resistance to cellulose fibers (usually in a sulfamide:phosphine oxide mole ratio of from about 0.5 to 2.5:1) produces an exceptionally effective textile treating concentrate. The preferred mole ratio of sulfamide to aziridinyl phosphine oxide or sulfide is from about 1.0:1 to 1.8:1, respectively. This mixture may be dissolved or dispersed in a suitable carrier (preferably water) to form a textile treating bath in which the concentration of the mixture in the bath may vary from about 10 percent by weight to 60 percent by weight (preferably from 20 to 40 percent) based upon the total weight of the treating bath.

By "sulfamide compound," as used herein, is meant a sulfamide of the formula

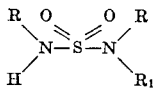

wherein each of R and $R_1$ is a hydrogen atom or a lower alkyl group of from 1 to 4 carbon atoms (i.e., a group of the formula $(C_kH_{2k})H$ in which $k$ is an integer of from 0 to 4). Those sulfamide compounds in which $R_1$ is a hydrogen atom form a preferred subclass of reactants. Sulfamide

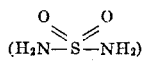

is the most reactive and least expensive of the sulfamide compounds and is generally used for commercial operations.

By the term "sulfamide-based polymer" is meant both oligomers and high molecular weight polymers formed by the heat-induced condensation of various sulfamide compounds or by the reaction of sulfuryl chloride ($SO_2Cl_2$) and excess ammonia. Thus, imido disulfamide

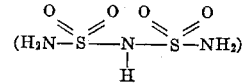

and trimolecular sulfimide

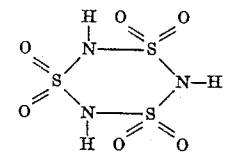

are among the products formed when $SO_2Cl_2$ is reacted with excess ammonia. Other known sulfamide-based polymers include linear compounds such as

which form trimolecular sulfimide by loss of ammonia and the ammonium salts of such compounds. Sulfamide-based polymers in which one or more aminohydrogen atoms has been replaced by a lower alkyl group (e.g., methyl, ethyl, n-propyl, i-propyl, n-butyl, i-butyl, sec.-butyl or tert.-butyl) are prepared by heating the corresponding alkyl-substituted sulfamide compound. These sulfamide-based polymers may be used directly in the process of the invention. When the sulfamide-based polymer is formed by heating sulfamide or an alkyl-substituted sulfamide, temperatures of from about 120° to 220° C. for a period of from ¼ to 12 hours are generally sufficient to at least partially polymerize the sulfamide compounds. Heating sulfamide at about 120°–160° C. for from 3 to 6 hours gives a glassy sulfamide-based polymeric material of indefinite composition which contains little (if any) sulfamide, but which may be used directly in the process of the invention without further modification. When thermally produced sulfamide-based polymers are used in place of a sulfamide compound in the process of the invention, the weight of polymer is expressed in terms of the weight of the amount of original sulfamide compound used to produce the polymer. The actual weight of polymer used will vary with the amount of ammonia or other volatile compounds lost during the thermal polymerization.

The terms "aziridinyl phosphine oxide" and/or "aziridinyl phosphine sulfide," as used herein, are meant to include those compounds of the formula

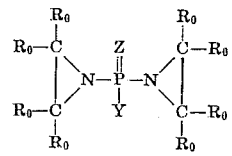

wherein Z represents an oxygen atom or a sulfur atom, each $R_0$ is independently a hydrogen atom or a lower alkyl group (i.e., the group $(C_kH_{2k})H$, as previously defined, wherein $k$ is an integer of from 0 to 4) and Y represents the group

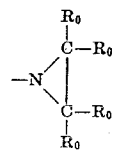

an alkoxy group of from 1 to 13 carbon atoms (i.e., the group $(OC_xH_{2x})H$ wherein $x$ is an integer of from 1 to 13), an aryloxy group of up to 10 carbon atoms (such as a phenoxy, tolyloxy or naphthyloxy group) or a group of the formula

wherein $R_0$ is as previously defined. Typical aziridinyl phosphine oxides and sulfides which may be used are disclosed, for example, in U.S. Patents 2,606,901 and 2,606,902, the teachings of which are herein incorporated by reference.

The treating compositions of the invention are preferably dissolved or dispersed in water at room temperature prior to use, but the compositions may be heated to form a prepolymer prior to deposition on the cellulosic material. The treating compositions will impart a degree of flame-resistance to cellulosic materials, but are particularly effective for textile treatment, especially for cotton and rayon fabrics. The treating compositions are compatible with other conventional bath additives such as fabric softeners and conventional wetting agents, although the use of such agents is not necessary for the preparation of cellulosic materials with improved fire-retardant and strength properties. In addition, the treated fabric products have improved anti-crush and wrinkle-resistant properties.

The treating method is carried out by contacting the cellulosic material to be treated with a solution or dispersion of the treating composition in a suitable solvent for a period of time sufficient to impregnate the cellulosic material with the treating composition. The impregnated product is then dried and cured at elevated temperatures (usually 150° to 180° C.). Curing may also be accomplished (either catalytically or non-catalytically) at ambient room temperatures over extended time periods (several weeks). When cellulosic textiles are treated, an aqueous dispersion or solution containing from about 20 percent to 40 percent by weight of a mixture of a sulfamide (or a sulfamide-based polymer) and an aziridinyl phosphine oxide or sulfide (mole ratio of from about 1.0:1 to 1.8:1, respectively) may be used as a bath. The cellulosic textile is immersed in the bath (ordinarily times of from 5 seconds to about 5 minutes are sufficient) to impregnate the fabric, the impregnated textile is dried (temperatures of from 70° to 120° C. for 1 to 5 minutes; complete drying is not necessary) and the dried, impregnated textile is then cured at a temperature of from 150° to 180° C. for from ½ minute to about 15 minutes. The best drying and curing times and temperatures depend somewhat upon the nature of the cloth being treated. For example, for lightweight fabrics such as broadcloth, a drying time of 1½ to 2 minutes at 80°-90° C. is sufficient. For heavier fabrics used in work clothing (such as denim), a drying time of from 1½ to 2 minutes at 100°-120° C. may be used. For both types of fabrics, a preferred curing time is about 1½ to 2 minutes at a temperature of from 160° to 170° C. when using a treating solution containing from 30–50 percent by weight of a mixture of sulfamide and tris-(1-aziridinyl)phosphine oxide (APO) in a mole ratio of from 1.0:1 to 1.8:1, respectively.

Most of the commercially available durable textile flame-proofing finishes suffer from one or more of the following disabilities: (1) lack of durability to hot alkaline washes, (2) bath instability, (3) curing odors (such as formaldehyde), (4) loss of the fabric's strength properties and (5) poor hand ("handle"). The sulfamide-aziridinyl phosphine oxide (or sulfide) finish suffers from none of the above disadvantages and is thus a superior finish. The aziridinyl phosphine oxides and sulfides probably react with the sulfamides to give polymers containing phosphorus, nitrogen and sulfur which are bound to cloth by the reaction of the aziridinyl rings with the cellulosic hydroxyl groups.

The treated cellulosic materials prepared according to the present invention contain a sufficient amount of polymerized material on and within the fibers to impart flame-resistance to the treated materials. When fabrics are treated, from about 15 percent by weight to 30 percent by weight (based upon the total dry weight of the treated material) of the sulfamideaziridinyl phosphine oxide (or sulfide) is polymerized on and within the fibers. When wood is treated, smaller amounts of the treating composition are used, since it is not necessary to impregnate the wood deeply. Rendering the surface of the wood flame retardant is generally sufficient.

The following examples are submitted for the purpose of illustration only and are not to be construed as limiting the scope of the invention in any way.

The following standard procedures were employed in obtaining the test results for treated fabrics:

(1) Hand (or "handle")—This is an evaluation of how the fabric feels when it is crushed in the hands. "Normal" hand is approximately the hand of the untreated control fabric. This is an empirical (and often subjective) test.

(2) Durability washes—The durability of the finishes to hot alkaline washes was determined by washing the treated fabrics for 45 minutes in a 90°-95° C. aqueous solution containing 0.25 percent by weight sodium carbonate, 0.25 percent by weight straight soap and 0.025 percent by weight "TIDE" detergent.

(3) Vertical char length test—This test was run in accordance with the standard procedure described in AATCC (American Association of Textile Chemists and Colorists) Standard 34–1952. A mixture of 75 percent propane and 25 percent butane was the fuel used for the testing flame.

(4) Match test—This test was run essentially the same as the test described by J. D. Reid et al. in Textile Research Journal, vol. 26, p. 139 (1956), except that the sample size was 1 inch by 8–9 inches and the results were expressed as "passed" (either the strip did not burn or else it flickered and burned but went out in the bottom 3–4 inches) and "failed" (the strip burned completely or burned for about ½ of its length). The sample strips were all suspended vertically in a draft-free area and ignition was attempted with an open flame applied at the bottom of each strip.

(5) Elmendorf tear—This test measures the tearing force required by a piece of fabric of standard size using a swinging pendulum to tear the fabric. (ASTM D-1424-56T.)

Example I

A sample of cotton broadcloth was padded through an aqueous solution containing 15.0 percent APO and 12.4 percent by weight of sulfamide. The wet pickup was 81.8 percent by weight giving a calculated resin add-on of 22.4 percent by weight of the APO-sulfamide mixture, based upon the dry weight of the cloth. The wet cloth was dried 1¾ minutes at 90° C. and cured 1¾ minutes at 165° C. After curing, the treated cloth sample was washed and dried. The following average char lengths were obtained.

|  | Char length, in. |
|---|---|
| Initial (no washing) | 4.1 |
| Number of durability washes: |  |
| 1 | 3.6 |
| 2 | 3.5 |
| 4 | 3.6 |

The fabric had a normal hand.

Example II

A sample of cotton broadcloth was padded through an aqueous solution containing (all percentages by weight based upon the total weight of the bath) 15.0 percent APO, 15.0 percent sulfamide, 0.2 percent wetting agent (octyl phenoxypolyethoxy ethanol) and 3.0 percent polyethylene emulsion softener. The wet pickup was 79.3 percent by weight, giving a calculated resin add-on of 23.8 percent. The wet cloth was dried 1¾ minutes at 165° C. The sample had a normal hand. The tear strength was excellent when compared with that of the untreated control fabric:

|          | Elmendorf Tear (grams) | |
|----------|------|------|
|          | Warp | Fill |
| Control  | 703  | 593  |
| Treated  | 700  | 460  |

The following average char lengths were obtained.

| | Inches |
|---|---|
| Initial (no washing) | 3.9 |
| After four durability washes | 4.0 |

Example III

A sample of broadcloth was padded through an aqueous solution containing (all percentages by weight based on the total weight of the bath) 15.0 percent APO, 18.6 percent sulfamide, 0.2 percent octyl phenoxypolyethoxy ethanol and 3.0 percent polyethylene emulsion fabric softener. The wet pickup was 74.0 percent by weight giving a calculated resin add-on of 24.8 percent of the sulfamide-APO treating mixture. The wet cloth was dried 1½ minutes at 90° C. and cured 1½ minutes at 165° C. After curing, the sample was washed and dried. The hand of the treated sample was about normal. The following average char lengths were obtained:

| | Char length, in. |
|---|---|
| Initial (no washing) | 4.0 |
| Number of durability washes: | |
| 1 | 4.0 |
| 2 | 4.0 |
| 4 | 3.5 |

Example IV

A sample of broadcloth was padded through an aqueous solution containing (all percentages by weight based upon the total weight of the treating bath) 20.0 percent APO, 16.5 percent sulfamide, 0.2 percent octyl phenoxypolyethoxy ethanol and 3.0 percent polyethylene emulsion fabric softener. The wet pickup was 68.4 percent by weight giving a calculated resin add-on of 25.0 percent. The wet cloth was dried 1¾ minutes at 90° C. and cured 1¾ minutes at 165° C. After curing, the sample was washed and dried. The hand of the treated cloth was normal. The following average char lengths and match test results were obtained:

| | Char Lengths (inches) | Match Test Results |
|---|---|---|
| Initial (no washing) | 4.0 | Passed. |
| Number of durability washes: | | |
| 1 | 3.9 | Do. |
| 2 | 4.0 | Do. |
| 4 | 4.0 | Do. |

Example V

A sixty gram sample of sulfamide

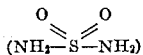

was heated in an open flask at 140° C. for 5 hours according to the method described in Vol. 56 of Chemical Abstracts, column 9697b, the material cooled to a glassy polymeric mass which was then dissolved in a portion of water and subsequently mixed with the other indicated ingredients shown to produce the following bath make-up:

| | Grams |
|---|---|
| APO in ethanol (80 percent) | 100 |
| Sulfamide (polymerized form) | 60 |
| Polyethylene emulsion fabric softener | 12 |
| Octyl phenoxypolyethoxy ethanol | 1 |
| Water | 227 |

A sample of white broadcloth was padded through the bath solution and the excess bath pressed out of the cloth by means of a laboratory padder. The wet pickup of the fabric was 67 percent, giving a calculated solids add-on of 23.4 percent APO plus polymerized sulfamide. The cloth was dried at 90° C. for 1¾ minutes and cured at 165° C. for 1¾ minutes. The durability of the flameproofing finish was similar to the product of Example IV and gave a char length of 3⅝ inches (average) after four durability washes.

Example VI

A mixture containing trimolecular sulfamide was prepared by bubbling anhydrous ammonia into a petroleum ether solution of one mole sulfuryl chloride until no further reaction occurred. The solid material was filtered and then suspended in methanol. To this slurry was added 3 moles triethylamine. The interchange of triethylamine for the ammonia in ammonium chloride gave a methanol-soluble salt which could be washed away from the sulfuryl chloride-ammonia product. This sulfamide polymer product (containing trimolecular sulfamide) was used to prepare the following textile treating bath:

| | Grams |
|---|---|
| APO in ethanol (80 percent) | 100 |
| Sulfamide polymer | 60 |
| Polyethylene emulsion fabric softener | 12 |
| Octyl phenoxypolyethoxy ethanol | 1 |
| Water | 227 |

Treatment of a sample of cotton broadcloth with this bath according to the method of Example V gave a 66.4 percent wet pickup (a calculated solid add-on of 23.2 percent APO plus sulfamide based polymer mixture). The fabric was dried and cured according to the method of Example V. After four durability washes, the treated product had an average char length of 4 inches.

We claim as our invention:
1. A method of treating a cellulosic material which comprises impregnating said material with a composition containing
(a) a member of the group consisting of a sulfamide compound of the formula

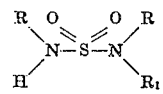

wherein each of R and $R_1$ is a group of the formula $(C_kH_{2k})H$ in which $k$ is an integer of from 0 to 4, and a sulfamidebased polymer, and
(b) an aziridinyl phosphorus compound of the formula

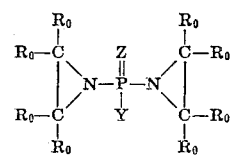

wherein Z is oxygen or sulfur, each $R_0$ is a group of the formula $(C_kH_{2k})H$ in which $k$ is an integer of from 0 to 4 and Y is selected from the group consisting of

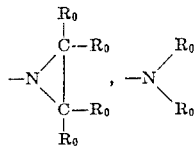

[each $R_0$ is as defined in (b)] $(OC_xH_{2x})H$ (in which $x$ is an integer of from 1 to 13) and an aryloxy group of from 6 to 10 carbon atoms, the molar ratio of (a) to (b) being from 0.5 to 2.5, to form an impregnated material and curing said impregnated material.

2. The process of claim 1 wherein the cellulosic material is wood.

3. The process of claim 1 wherein the cellulosic material is paper.

4. The process of claim 1 wherein the cellulosic material is cotton cloth.

5. The method of claim 1 wherein the cellulosic material is rayon.

6. A method of treating cotton cloth which comprises contacting the cotton cloth with an aqueous solution of one molar equivalent of sulfamide and 0.5 to 2.5 molar equivalents of tris(1-aziridinyl)phosphine oxide to impregnate the cloth with the solution, drying the impregnated cloth, and curing the dried, impregnated cloth at a temperature of from 150° to 180° C.

7. The method of claim 6 wherein the cloth is dried at a temperature of from 70° to 120° C.

8. The method of claim 6 wherein the aqueous solution contains from 20 to 40 percent by weight of the mixture of sulfamide and tris-(1-aziridinyl)phosphine oxide.

9. The process of claim 6 wherein the sulfamide:tris (1-aziridinyl)phosphine oxide mole ratio is from 1.0:1 to 1.8:1, respectively.

10. A polymerizable concentrate for the treatment of a cellulosic material which comprises:
(a) a compound of the formula

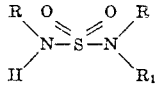

and (b) a compound of the formula

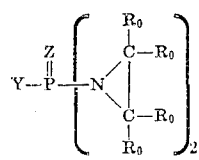

in which the mole ratio of (a):(b) is from 0.5:1 to 2.5:1 and wherein
(1) each of $R_0$, R and $R_1$ is a group of the formula $(C_kH_{2k})H$ in which $k$ is an integer of from 0 to 4,
(2) Z is oxygen or sulfur, and
(3) Y is selected from the group consisting of

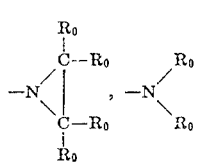

[each $R_0$ is as defined in (1)] $(OC_xH_{2x})H$ (in which $x$ is an integer of from 1 to 13) and an aryloxy group of from 6 to 10 carbon atoms.

11. A treated cellulosic material which contains from 15 to 30 percent by weight of the composition of claim 10 in polymerized form.

12. A polymerizable concentrate for treatment of cotton cloth which comprises a mixture of sulfamide and tris-(1-aziridinyl)phosphine oxide in a mole ratio of from 0.5:1 to 2.5:1, respectively.

13. Treated cotton cloth which contains from 15 to 30 percent by weight of the composition of claim 12 in polymerized form.

14. A method of treating a cellulosic material which comprises impregnating said material with a compound of the formula (a) 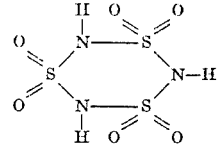

and a compound of the formula (b) 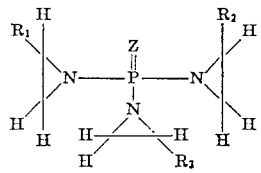

wherein each of $R_1$, $R_2$ and $R_3$ is a group of the formula $(C_kH_{2k})H$ in which $k$ is an integer of from 0 to 4 and wherein Z represents oxygen or sulfur, the molar ratio of (a) to (b) being from 0.5 to 2.5, and curing the thus impregnated material.

15. The method of claim 14 wherein the cellulosic material is cotton fabric.

16. The method of claim 14 wherein the cellulosic material is rayon fabric.

17. A method of treating a cellulosic material which comprises impregnating said material with a mixture of (a) tris-(1-aziridinyl)phosphine oxide and (b) a sulfamide-based polymer formed by heating a sulfamide compound at a temperature of from 120° to 220° C., the molar ratio of (a) to (b) being between 0.4 and 2, to form an impregnated material and curing said material.

18. A method of treating cotton fabric which comprises impregnating said cloth with a mixture of (a) tris-(1-aziridinyl)phosphine oxide and (b) a compound of the formula

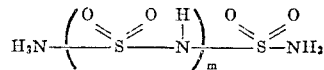

in which $m$ is an integer of from 0 to 3, the molar ratio of (a) to (b) being between 0.4 to $(m+1)$ and 2 $(m+1)$ to impregnate the fabric and curing the impregnated fabric.

References Cited

UNITED STATES PATENTS

| | | | |
|---|---|---|---|
| 2,859,134 | 11/1958 | Reeves et al. | 117—136 |
| 2,889,289 | 6/1959 | Reeves et al. | 117—136 X |
| 2,891,877 | 6/1959 | Chance et al. | 117—136 |
| 2,901,444 | 8/1959 | Chance et al. | 117—136 X |
| 3,034,919 | 5/1962 | Steinhauer | 106—15 |

FOREIGN PATENTS 761,985  11/1956  Great Britain.

WILLIAM D. MARTIN, *Primary Examiner.*

T. G. DAVIS, *Assistant Examiner.*